US008663367B2

United States Patent
Minhas et al.

(10) Patent No.: US 8,663,367 B2
(45) Date of Patent: Mar. 4, 2014

(54) RECOVERY OF GREENHOUSE GAS AND PRESSURIZATION FOR TRANSPORT

(71) Applicants: Bhupender S. Minhas, Bridgewater, NJ (US); Ian A. Cody, Adelaide (AU)

(72) Inventors: Bhupender S. Minhas, Bridgewater, NJ (US); Ian A. Cody, Adelaide (AU)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/045,987

(22) Filed: Oct. 4, 2013

(65) Prior Publication Data

US 2014/0037382 A1 Feb. 6, 2014

Related U.S. Application Data

(62) Division of application No. 13/292,393, filed on Nov. 9, 2011, now Pat. No. 8,580,018.

(60) Provisional application No. 61/413,111, filed on Nov. 12, 2010.

(51) Int. Cl.
*B01D 53/02* (2006.01)

(52) U.S. Cl.
USPC .................. 95/139; 96/108; 96/121; 96/126; 96/146

(58) Field of Classification Search
USPC ........................ 95/139; 96/108, 121, 126, 146
See application file for complete search history.

(56) References Cited

U.S. PATENT DOCUMENTS

| 5,137,558 | A | 8/1992 | Agrawal |
|---|---|---|---|
| 7,282,189 | B2 | 10/2007 | Zauderer |
| 7,726,402 | B2 | 6/2010 | Ramakrishnan et al. |
| 7,985,278 | B2 | 7/2011 | Guidati et al. |
| 8,425,674 | B2 | 4/2013 | Minhas et al. |
| 2007/0215350 | A1 | 9/2007 | Kresnyak et al. |
| 2008/0282888 | A1 | 11/2008 | Deckman et al. |
| 2009/0173073 | A1 | 7/2009 | Guidati et al. |
| 2010/0132359 | A1 | 6/2010 | Minhas et al. |
| 2010/0251887 | A1 | 10/2010 | Jain |
| 2011/0239692 | A1 | 10/2011 | Minhas et al. |
| 2011/0302932 | A1 | 12/2011 | Hopkins |

FOREIGN PATENT DOCUMENTS

| EP | 1353112 | 10/2003 |
|---|---|---|
| FR | 2675890 | 10/1992 |
| WO | 2007111738 A2 | 10/2007 |

OTHER PUBLICATIONS

Wang et al, "Colossal Cages in Zeolitic Imidazolate Frameworks As Selective Carbon Dioxide Reservoirs", Nature, vol. 453, pp. 207-212, May 8, 2008.
PCT Search Report issued Feb. 6, 2012 in corresponding PCT Application No. PCT/US2011/0600096.
PCT Written Opinion issued Feb. 6, 2012 in corresponding PCT Application No. PCT/US2011/0600096.
"Zeolitic Imidazole Framework (ZIF) Sorbent Materials", Nature, vol. 453, pp. 207-211 (May 8, 2008).
Kirk-Othmer, "Molecular Sieves", Encyclopedia of Chemical Technology, vol. 16, Fourth Edition, Nov. 2004.

*Primary Examiner* — Christopher P Jones
(74) *Attorney, Agent, or Firm* — Malcolm D. Keen; Glenn T. Barrett

(57) ABSTRACT

A system for isolating a greenhouse gas from an exhaust gas includes a vessel having an inlet to receive an exhaust gas, and an outlet to discharge a process stream, an adsorbent contained in the vessel to selectively adsorb the greenhouse gas from the exhaust gas under suitable conditions, and a heat source to heat the adsorbent and desorb the adsorbed greenhouse gas therefrom to produce a process stream of greenhouse gas for release through the outlet.

8 Claims, 2 Drawing Sheets

RECOVERY OF GREENHOUSE GAS AND PRESSURIZATION FOR TRANSPORT

CROSS REFERENCE TO RELATED APPLICATIONS

This application is a divisional application of U.S. patent application Ser. No. 13/292,393 filed on Nov. 9, 2011, which relates and claims priority to U.S. Provisional Application No. 61/413,111 filed on Nov. 12, 2010.

FIELD

The present invention relates to methods and systems of employing an adsorption process to isolate and pressurize a greenhouse gas from an exhaust gas to transport the gas. These methods and systems are particularly applicable to greenhouse gas separation and sequestration efforts.

BACKGROUND

Greenhouses gases, such as carbon dioxide, nitrous oxide and ozone, are present in exhaust streams that result from combustion operations. The release of greenhouse gases to the atmosphere has become the subject of increasing concern, and may be regulated in the future. It is possible that taxes may be imposed on industrial processes based on the amount of greenhouse gas emitted.

One option to prevent the emission of greenhouse gases is to isolate the greenhouse gas and transport it to a subterranean location where it can be sequestered. As an alternative to sequestration, there are other uses for greenhouse gases, such as cooling, work or power generation, that are preferable to simply releasing the greenhouse gas to the atmosphere.

In order to either sequester, or make beneficial use of, the greenhouse gas present in an exhaust gas, it must be separated from the greenhouse gas and sufficiently pressurized for transport. Accordingly, there is a need for efficient means to isolate a greenhouse gas from an exhaust gas for transport.

SUMMARY

One aspect of the present application provides a system for isolating a greenhouse gas from an exhaust gas. The system includes a vessel having an inlet to receive an exhaust gas, and an outlet to discharge a process stream, an adsorbent contained in the vessel to selectively adsorb the greenhouse gas from the exhaust gas under suitable conditions, and a heat source to heat the adsorbent and desorb the adsorbed greenhouse gas therefrom to produce a process stream of greenhouse gas for release through the outlet.

Another aspect of the present application provides a process for isolating a greenhouse gas from an exhaust gas. The process includes introducing an exhaust gas into a vessel having an inlet to receive the exhaust gas, an adsorbent to selectively adsorb the greenhouse gas from the exhaust gas under suitable conditions, and an outlet to discharge a process stream. The process further includes applying a heat source to heat the adsorbent to desorb the adsorbed greenhouse gas therefrom to produce a process stream of greenhouse gas for release through the outlet.

DETAILED DESCRIPTION

Definitions

Figure 1:
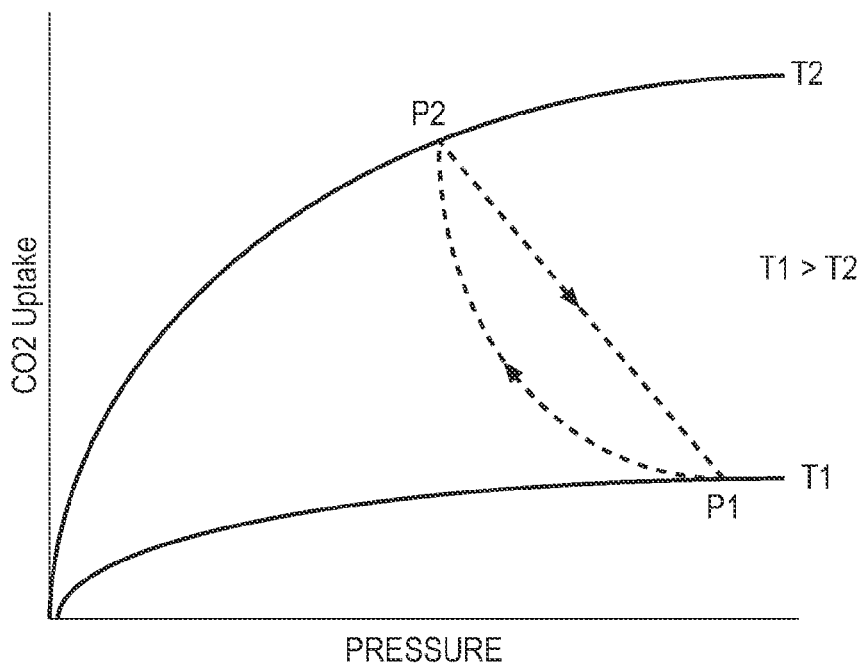
FIG. 1 shows pressure and temperature information for an adsorption process used to isolate a greenhouse gas from a flue gas.

As used herein, the term "vessel" refers to an enclosed container suitable for containing an adsorbent and a fluid (generally a greenhouse gas) under suitable conditions to permit adsorption and desorption.

As used herein, an "exhaust gas" includes any gas that is emitted from a process (e.g. an industrial process) or combustion operation.

As used herein, the term "flue gas" refers to a gas that is emitted from an industrial combustion operation and which is directly or indirectly emitted to the atmosphere (e.g., via a flue, stack, pipe or other channel). A flue gas includes, but is not limited to, gases emitted from furnaces, boilers, ovens and combustion operations associated with petrochemical refining or chemical processing operations. Flue gas may also include turbine exhaust.

As used herein, the term "unutilized heat" or "unutilized heat source" refers to the residual or remaining heat source (e.g., steam) remaining following the processing operation after the heat source has been used for its primary purpose in the refining or petrochemical processing operation. Unutilized heat is also referred to as waste heat. The unutilized heat or unutilized heat source refers to a heat source that is no longer any use in the refining and/or petrochemical processing operation and would traditionally be discarded. The unutilized heat can be provided as a unutilized heat stream. For example, but not limitation, unutilized heat can include steam that was employed in a heat exchanger used in petroleum and petrochemical processing, and is of no value to current processes and is being discarded. Flue gases are an effective waste heat source.

As used herein, the term "pump" refers to a device to assist in transporting fluids from one place to another.

As used herein, a conduit (e.g., a pipeline) is in communication with a subterranean outlet when the contents of the conduit (i.e., a greenhouse gas) can be deposited in the subterranean outlet to sequester the greenhouse gas, and may include the presence of intermediate unit operations and apparatuses in connection therewith, such as compressors, filtration devices, or the like, in between the conduit and the ultimate outlet for sequestration.

One aspect of the present application provides a system for isolating a greenhouse gas (e.g., carbon dioxide) from an exhaust gas, such as a flue gas. The system includes a vessel having an inlet to receive an exhaust gas, and an outlet to discharge a process stream, an adsorbent (e.g., zeolites, zeolitic imidazolate frameworks (ZIFs), Metal-Organic Frameworks (MOFs), and any combination thereof) contained in the vessel to selectively adsorb the greenhouse gas from the exhaust gas under suitable conditions, and a heat source to heat the adsorbent and desorb the adsorbed greenhouse gas therefrom to produce a process stream of greenhouse gas for release through the outlet.

In one embodiment, the system further includes a cooler to cool the exhaust gas prior to entering the vessel (e.g., an adsorption bed). An expansion valve can be provided to receive at least a portion of the process stream of greenhouse gas to provide cooling fluid to cool the exhaust gas in the cooler.

The heating source for the vessel can include unutilized heat from a petrochemical refining operation or a chemical processing operation. The unutilized heat can be at a temperature of 800K or lower, such as from about 363K to about 453K.

Another aspect of the present application provides a process for isolating a greenhouse gas from an exhaust gas. The process includes introducing an exhaust gas into a vessel having an inlet to receive the exhaust gas, an adsorbent to selectively adsorb the greenhouse gas from the exhaust gas under suitable conditions, and an outlet to discharge a process stream. The process further includes applying a heat source to heat the adsorbent to desorb the adsorbed greenhouse gas therefrom to produce a process stream of greenhouse gas for release through the outlet.

The system furthers include a conduit (e.g., a pipeline) in fluid communication with the outlet of the vessel to transport the process stream of greenhouse gas. For example, the conduit can in communication with a subterranean outlet to sequester the greenhouse gas. The subterranean outlet can include a hydrocarbon deposit. Thus sequestering the greenhouse gas can also aid in the extraction of hydrocarbons.

Another aspect of the present application provides a process for isolating a greenhouse gas from an exhaust gas. The process includes introducing an exhaust gas into a vessel having an inlet to receive the exhaust gas, an adsorbent to selectively adsorb the greenhouse gas from the exhaust gas under suitable conditions, and an outlet to discharge a process stream. The process further includes applying a heat source to heat the adsorbent to desorb the adsorbed greenhouse gas therefrom to produce a process stream of greenhouse gas for release through the outlet.

The method will be understood from, and described in further detail with the description of the system.

For purposes of illustration, and not limitation, an exemplary process for isolating a greenhouse gas from an exhaust gas for external transport is described below and with reference to FIG. 1. An adsorbent selectively adsorbs certain greenhouse gases, for example $CO_2$, from an exhaust gas stream (e.g., a flue gas resulting from a combustion operation in a petrochemical refining operation) at a low temperature & pressure (T2, P2, as designated in FIG. 1), thus isolating the $CO_2$ from the exhaust gas. The adsorbent bed is isolated, via valving, when saturated with $CO_2$, and then heated to T1 using a heating media (e.g., waste heat) to desorb $CO_2$. As a result, of the limited volume for adsorbent, the $CO_2$ is pressurized to P1 (as designated in FIG. 1) and is thus in an isolated and pressurized state suitable for transport, work, refrigeration, electricity generation, or reuse as desired.

Figure 2:
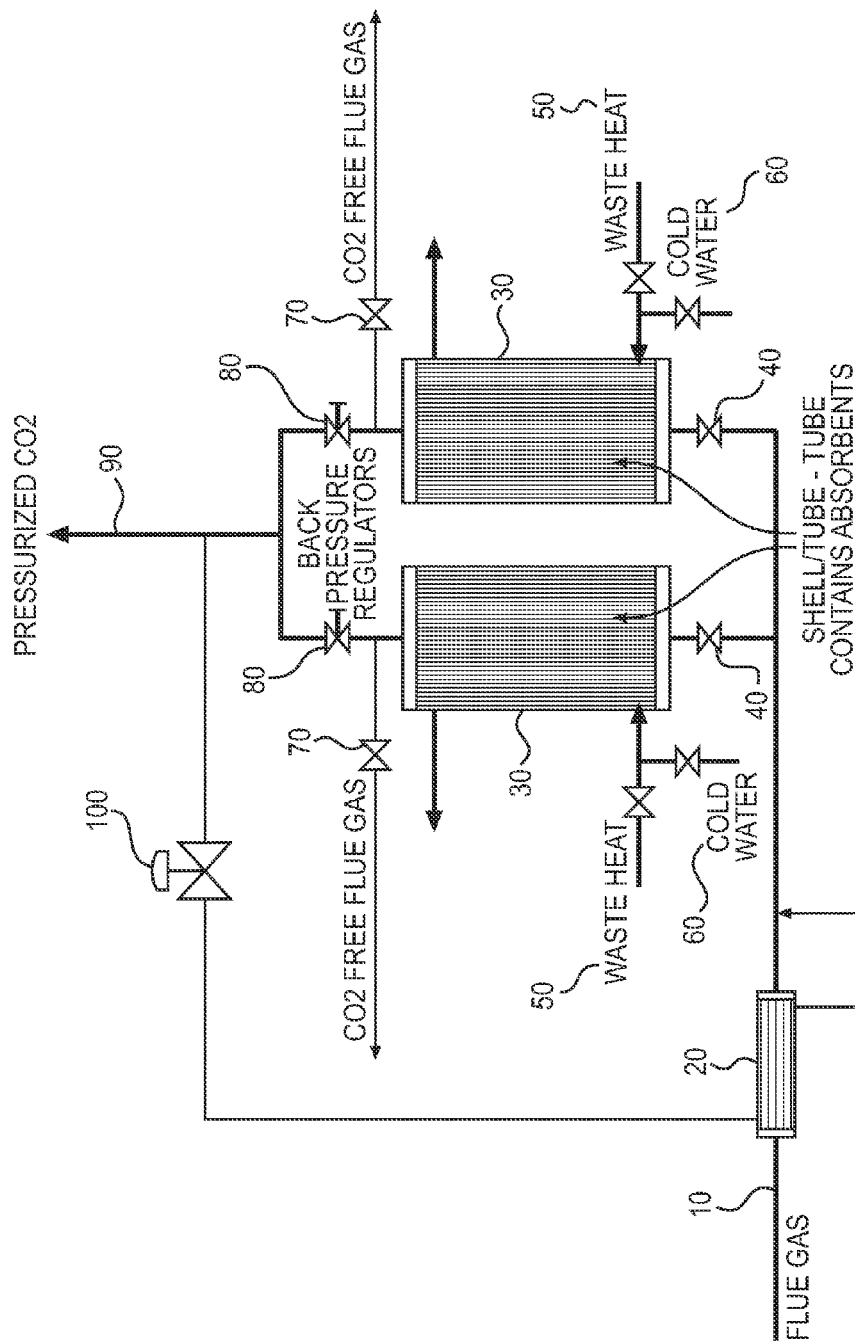
FIG. 2 shows a system for isolating a greenhouse gas from an exhaust gas for transport, in which carbon dioxide is isolated from a flue gas and pressurized using an adsorption bed process.

FIG. 2 illustrates a schematic of an exemplary system for isolating a greenhouse gas from an exhaust stream for transport. As embodied herein, for illustration and not limitation, a flue gas (10) is provided from a petrochemical refining operation and introduced to adsorption beds (30). If desired, a cooler (20) can be provided to cool the flue gas and reduce its temperature before being introduced to the adsorbent bed. In this particular example, a shell and tube adsorbent bed is provided, in which the tubes contain adsorbents. Other types and configurations of adsorption beds, however, could be employed.

After the adsorption bed is saturated with $CO_2$, the particular adsorption bed is isolated via valves 40 and a desorption stroke is initiated. The flue gas can then be diverted to an alternative adsorption bed to initiate an adsorption stroke, thus providing for a continuous process in which at least one adsorbent bed is in an adsorption stroke and receiving a feed of flue gas and at least one adsorption bed is in a desorption stroke to provided pressurized $CO_2$.

Upon being saturated, and after the adsorbent bed is isolated, the desorption stroke can be initiated by heating the adsorption bed with a heat source. As embodied herein, the adsorbent bed is isolated and heated using an unutilized heat source or a waste heat steam stream (50) or (uncooled) flue gas to initiate the desorption stroke. Also as embodied herein, the adsorption beds in an adsorption stroke are fed cold water (60) to reduce the operating temperature of the adsorption bed to provide for adsorption. The adsorbent beds undergoing an adsorption stroke are valved using valves (70) to emit $CO_2$-free flue gas (i.e., the flue gas without the adsorbed $CO_2$ to the atmosphere or other desired location). Back pressure regulator valves (80) are also provided to control the operating pressure of the adsorbent beds and the pressure of the pressurized $CO_2$ (90).

During desorption, $CO_2$ is released and the pressure goes up in the adsorption bed. The pressurized $CO_2$ (90) can be transported for sequestration or for used for any other purpose in which a pressurized gas stream could be used (e.g., work, electricity, refrigeration via an expansion valve, carbonation for drinks). Also, some of the pressurized $CO_2$ can directed to an expansion valve (100) to provide cooling for the cooler (20) and subsequently re-introduced to the process (via line 110).

Gases Being Transported

The systems and methods of the presently disclosed subject matter can be used to isolate and pressurize greenhouse gas for transport. The greenhouse gas selectively and reversibly binds to the adsorbent, in a chemical or physical sense, and thus is akin to a "working fluid" or "refrigerant" in a traditional adsorption process.

Non-limiting examples of gases that can be used in accordance with the present application include, but are not limited to, various greenhouse gas that may be present in an exhaust gas stream, including carbon dioxide, methane, nitrogen oxides ($NO_x$) and ozone.

It is understood that, while the methods and systems of the present application provide a pressurized gas stream for transport, compressors can be provided along a pipeline or other conduit to further assist in transporting the greenhouse gas to a desired location (e.g., downhole to sequester the greenhouse gas and/or to aid in the extraction of hydrocarbons from a subterranean reserve). The techniques disclosed in co pending U.S. patent application Ser. No. 13/292,381, filed on Nov. 9, 2011, which claims priority to U.S. Provisional Application No. 61/413,122, entitled "Adsorption Chilling For Compressing and Transporting Gases" filed on Nov. 12, 2010 can be used to further assist in the transport of greenhouse gas to the desired location and are hereby incorporated by reference.

A person of ordinary skill in the art can determine procedures for the sequestration of greenhouse gases (e.g., carbon dioxide), once the greenhouse gas is transported to a proper location. Furthermore, sequestration details can be found, for example, in U.S. Pat. Nos. 7,726,402, and 7,282,189, each of which hereby incorporated by reference. Further details regarding techniques for depositing gases downhole to aid in the recovery of crude oil and/or natural gas can be found, for example, in U.S. Published Application No. 2007/0215350, hereby also incorporated by reference.

Adsorbents

Adsorbents that can be used in embodiments of the present invention include, but are not limited to, metal-organic framework-based (MOF-based) sorbents, zeolitic imidazole framework (ZIF) sorbent materials, zeolites and carbon.

MOF-based adsorbents include, but are not limited to, MOF-based adsorbents with a plurality of metal, metal oxide, metal cluster or metal oxide cluster building units. As disclosed in International Published Application No. WO 2007/111738, which is hereby incorporated by reference, the metal can be selected from the transition metals in the periodic table, and beryllium. Exemplary metals include zinc (Zn), cadmium (Cd), mercury (Hg), and beryllium (Be). The metal building units can be linked by organic compounds to form a porous structure, where the organic compounds for linking the adjacent metal building units can include 1,3,5-benzenetribenzoate (BTB); 1,4-benzenedicarboxylate (BDC); cyclobutyl 1,4-benzenedicarboxylate (CB BDC); 2-amino 1,4 benzenedicarboxylate ($H_2N$ BDC); tetrahydropyrene 2,7-dicarboxylate (HPDC); terphenyl dicarboxylate (TPDC); 2,6 naphthalene dicarboxylate (2,6-NDC); pyrene 2,7-dicarboxylate (PDC); biphenyl dicarboxylate (BDC); or any dicarboxylate having phenyl compounds.

Specific materials MOF-based adsorbent materials include: MOF-177, a material having a general formula of $Zn_4O(1, 3, 5\text{-benzenetribenzoate})_2$; MOF-5, also known as IRMOF-I, a material having a general formula of $Zn_4O(1,4\text{-benzenedicarboxylate})_3$; IRMOF-6, a material having a general formula of $Zn_4O(\text{cyclobutyl 1,4-benzenedicarboxylate})$; IRMOF-3, a material having a general formula of $Zn_4O(2\text{-amino 1,4 benzenedicarboxylate})_3$; and IRMOF-11, a material having a general formula of $Zn_4O(\text{terphenyl dicarboxylate})_3$, or $Zn_4O(\text{tetrahydropyrene 2,7-dicarboxylate})_3$; and IRMOF-8, a material having a general formula of $Zn_4O(2,6\text{ naphthalene dicarboxylate})_3$.

Exemplary zeolitic imidazole framework (ZIF) sorbent materials include, but are not limited to, ZIF-68, ZIF-60, ZIF-70, ZIF-95, ZIF-100 developed at the University of California at Los Angeles and generally discussed in Nature 453, 207-211 (8 May 2008), hereby incorporated by reference in its entirety.

Zeolite adsorbent materials include, but are not limited to, aluminosilicates that are represented by the formula $M_{2/n}O.Al_2O_3.ySiO_2.wH_2O$, where y is 2 or greater, M is the charge balancing cation, such as sodium, potassium, magnesium and calcium, N is the cation valence, and w represents the moles of water contained in the zeolitic voids. Examples of zeolites that can be included in the methods and systems of the present application include natural and synthetic zeolites.

Natural zeolites include, but are not limited to, chabazite (CAS Registry No. 12251-32-0; typical formula $Ca_2[(AlO_2)_4(SiO_2)_8].13H_2O$), mordenite (CAS Registry No. 12173-98-7; typical formula $Na_8[(AlO_2)_8(SiO_2)_{40}].24H_2O$), erionite (CAS Registry No. 12150-42-8; typical formula $(Ca, Mg, Na_2, K_2)_{4.5}[(AlO_2)_9(SiO_2)_{27}].27H_2O$), faujasite (CAS Registry No. 12173-28-3, typical formula $(Ca, Mg, Na_2, K_2)_{29.5}[(AlO_2)_{59}(SiO_2)_{133}].235H_2O$), clinoptilolite (CAS Registry No. 12321-85-6, typical formula $Na_6[(AlO_2)_6(SiO_2)_{30}].24H_2O$) and phillipsite (typical formula: $(0.5Ca, Na, K)_3[(AlO_2)_3(SiO_2)_5].6H_2O$).

Synthetic zeolites include, but are not limited to, zeolite A (typical formula: $Na_{12}[(AlO_2)_{12}(SiO_2)_{12}].27H_2O$), zeolite X (CAS Registry No. 68989-23-1; typical formula: $Na_{86}[(AlO_2)_{86}(SiO_2)_{106}].264H_2O$), zeolite Y (typical formula: $Na_{56}[(AlO_2)_{56}(SiO_2)_{136}].250H_2O$), zeolite L (typical formula: $K_9[(AlO_2)_9(SiO_2)_{27}].22H_2O$), zeolite omega (typical formula: $Na_{6.8}TMA_{1.6}[(AlO_2)_8(SiO_2)_{28}].21H_2O$, where TMA is tetramethylammonium) and ZSM-5 (typical formula: $(Na, TPA)_3[(AlO_2)_3(SiO_2)_{93}].116H_2O$, where TPA is tetrapropylammonium).

Zeolites that can be used in the embodiments of the present application also include the zeolites disclosed in the Encyclopedia of Chemical Technology by Kirk-Othmer, Volume 16, Fourth Edition, under the heading "Molecular Sieves," which is hereby incorporated by reference in its entirety.

Synthetic zeolite adsorbent materials are commercially available, such as under the Sylosiv® brand from W.R. Grace and Co. (Columbia, Md.) and from Chengdu Beyond Chemical (Sichuan, P.R. China). For example, Sylosiv® A10 is one commercially available zeolite 13X product.

Selection of Adsorbents

Persons of ordinary skill in the art can select proper adsorbents based on the particular greenhouse gas which is desired to be isolated and pressurized for transportation purposes. The adsorbent should selectively bind to the greenhouse gas, yet be released (or desorbed) when heated. As disclosed in U.S. Published Application No. 2010/0132359, hereby incorporated by reference, a "pressure index" can be determined at various desorbing temperatures and can be used to select the sorbent material and fluid.

The pressure index is determined by the following method. One hundred (100) grams of sorbent material are placed in a 1 liter vessel designed to be isolated from associated equipment with existing valves on both ends of the vessel. The vessel also has indicators to measure inside pressure and temperature. The vessel is flushed and filled with pure fluid (e.g., $CO_2$) at one atmospheric pressure. The sorbent material adsorbs fluid and the sorbent may heat up. The vessel is equilibrated at 298 K and 1 atmospheric pressure, this sorbing pressure being defined as $P_I=1.0$. The vessel is heated to a pre-selected desorbing temperature (e.g. 348 K). When the vessel and sorbent material reach the pre-selected desorbing temperature, the internal vessel pressure is measured to determine $P_F$. The pressure index is defined as the ratio of $P_F$ to $P_I$.

Certain embodiments of the present application make use of lower temperature, unutilized heat (also referred to as waste heat). In order to select a sorbent material/fluid combination that can be used with, for example, relatively low grade waste heat, adsorbents and fluids can be selected with minimum pressure indexes, as defined above. In one embodiment the adsorbent and fluid are selected such that the pressure index is at least 1.2, or at least 1.5, or at least 3, or at least 4, or at least 6.

While not limited thereto, U.S. Published Application No. 2010/0132359 discloses details regarding an embodiment in which carbon dioxide is used as a working fluid and Zeolite 13X is used as the adsorbent. Other appropriate adsorbents can be selected based on, for example, the working fluid employed and the heat available to drive the desorption stroke.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosures of each of which is incorporated herein by reference in its entirety for all purposes.

The invention claimed is:

1. A process for isolating carbon dioxide from a stream of an exhaust gas resulting from combustion, comprising:
    introducing the exhaust gas stream to a cooler to cool the gas stream, introducing the stream of cooled exhaust gas into a vessel having an inlet to receive the cooled exhaust gas, an adsorbent to selectively adsorb the carbon dioxide from the exhaust gas and an outlet to discharge a process stream;

applying heat from a heat source to heat the adsorbent to desorb the adsorbed carbon dioxide from the adsorbent to produce a process stream of pressurized carbon dioxide for release through the outlet, expanding the pressurized stream of carbon dioxide from the outlet to cool the stream and provide a stream of cooled carbon dioxide, passing the stream of cooled carbon dioxide to the cooler to provide cooling for the cooler to cool the stream of exhaust gas, introducing the carbon dioxide stream from the cooler into the stream of cooled exhaust gas.

2. The process of claim 1, wherein the adsorbent is selected from zeolites, zeolitic imidazolate frameworks (ZIFs), Metal-Organic Frameworks (MOFs), and any combination thereof.

3. The process of claim 1, wherein the heating fluid is unutilized heat from a petrochemical refining operation or a chemical processing operation.

4. The process of claim 3, wherein the unutilized heat is at a temperature of 600K or lower.

5. The process of claim 4, wherein the temperature of the unutilized heat ranges from about 363K to about 453K.

6. The process of claim 4, further comprising introducing the process stream of pressurized carbon dioxide to a conduit to transport the process stream of pressurized carbon dioxide.

7. The process of claim 6, wherein the conduit is in communication with a subterranean outlet to sequester the carbon dioxide.

8. The process of claim 7, wherein the subterranean outlet includes a hydrocarbon deposit.

* * * * *